United States Patent
Joharapurkar et al.

(10) Patent No.: US 9,965,652 B2
(45) Date of Patent: May 8, 2018

(54) DETECTING AND THWARTING BACKSIDE ATTACKS ON SECURED SYSTEMS

(71) Applicant: Maxim Integrated Products, Inc., San Jose, CA (US)

(72) Inventors: Ashutosh Ravindra Joharapurkar, Bangalore (IN); Sung Ung Kwak, Frisco, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 98 days.

(21) Appl. No.: 14/717,705

(22) Filed: May 20, 2015

(65) Prior Publication Data
US 2016/0042199 A1    Feb. 11, 2016

Related U.S. Application Data (60) Provisional application No. 62/034,029, filed on Aug. 6, 2014.

(51) Int. Cl.
| | |
|---|---|
| G06F 21/00 | (2013.01) |
| G06F 21/71 | (2013.01) |
| G06F 21/75 | (2013.01) |
| G06F 1/26 | (2006.01) |
| G06F 11/00 | (2006.01) |
| G08B 13/00 | (2006.01) |
| G08B 21/00 | (2006.01) |
| G08B 29/00 | (2006.01) |

(52) U.S. Cl.
CPC ............ *G06F 21/71* (2013.01); *G06F 21/75* (2013.01)

(58) Field of Classification Search
None
See application file for complete search history.

(56) References Cited

U.S. PATENT DOCUMENTS

| | | | |
|---|---|---|---|
| 2003/0012925 A1* | 1/2003 | Gorrell | H01L 21/30608 428/137 |
| 2010/0078636 A1* | 4/2010 | Zachariasse | G06F 21/77 257/48 |
| 2011/0089506 A1* | 4/2011 | Hoofman | G06F 21/87 257/417 |
| 2011/0215823 A1* | 9/2011 | Solki | G01R 27/08 324/705 |
| 2012/0242356 A1* | 9/2012 | Ohuchi | H01L 22/34 324/705 |
| 2012/0320477 A1* | 12/2012 | Lisart | H01L 21/763 361/78 |

(Continued)

*Primary Examiner* — Eric Chen
(74) *Attorney, Agent, or Firm* — North Weber & Baugh LLP (57) ABSTRACT

Security devices for protecting ICs from backside security attacks. A security device includes an N− well formed in a substrate, a P+ center disposed in the central region of the N− well, and a P+ ring surrounding the N− well. To prevent latchup, a pair of inner and outer N+ rings is formed in the N− well. When a current source is applied to the P+ center, the current flows through a portion of the substrate and is picked up by the P+ ring. When an attacker mills the substrate or makes a trench in the substrate, the resistance of the substrate changes. By monitoring the voltage difference between the P+ center and P+ ring, the attempt to attack the die can be detected.

20 Claims, 6 Drawing Sheets

(56) References Cited

U.S. PATENT DOCUMENTS

| | | | |
|---|---|---|---|
| 2013/0193437 A1* | 8/2013 | Lisart | H01L 23/57 257/48 |
| 2013/0314121 A1* | 11/2013 | Mougin | G06F 21/75 326/8 |
| 2014/0103957 A1* | 4/2014 | Fritz | H01L 23/576 326/8 |
| 2014/0111230 A1* | 4/2014 | Lisart | H01L 23/576 324/705 |
| 2014/0138686 A1* | 5/2014 | Wuidart | H01L 23/576 257/48 |
| 2015/0014687 A1* | 1/2015 | Nakajima | G01R 19/0084 257/48 |
| 2015/0214163 A1* | 7/2015 | Kuenemund | H01L 23/57 324/76.11 |
| 2016/0218071 A1* | 7/2016 | Nam | H01L 23/576 |

* cited by examiner

DETECTING AND THWARTING BACKSIDE ATTACKS ON SECURED SYSTEMS

CROSS-REFERENCE TO RELATED APPLICATIONS

This application claims the benefit of U.S. Provisional Applications No. 62/034,029, entitled "Detecting and thwarting backside attacks on secured systems," filed Aug. 6, 2014, and naming as inventors Ashutosh Ravindra Joharapurkar and Sung Ung Kwak, which application is hereby incorporated herein by reference in its entirety.

BACKGROUND

A. Technical Field

The present invention relates to security devices for integrated circuits (ICs), and more particularly, to devices to protect ICs from backside security attacks.

B. Background of the Invention

With the advent of modern wafer processing technology, IC manufactures have developed various approaches to increase the security threshold of ICs. For example, all embedded memories are encrypted on modern security ICs. Also, design rules applied to modern implementations ensure that security related signals are routed to the lower metal layers of ICs, making the invasive frontside analysis significantly more difficult to perform. In another example, meshes are implemented to protect against the frontside attack, which are redundant layers of metallization on top of the IC itself. Typically, meshes are deposited over multiple layers of metallization to enhance the likelihood of detecting a fault. If the IC is compromised by an attacker and a fault is detected, the IC can subsequently execute a mitigation routine that destroys secret data stored in the IC.

Figure 1:
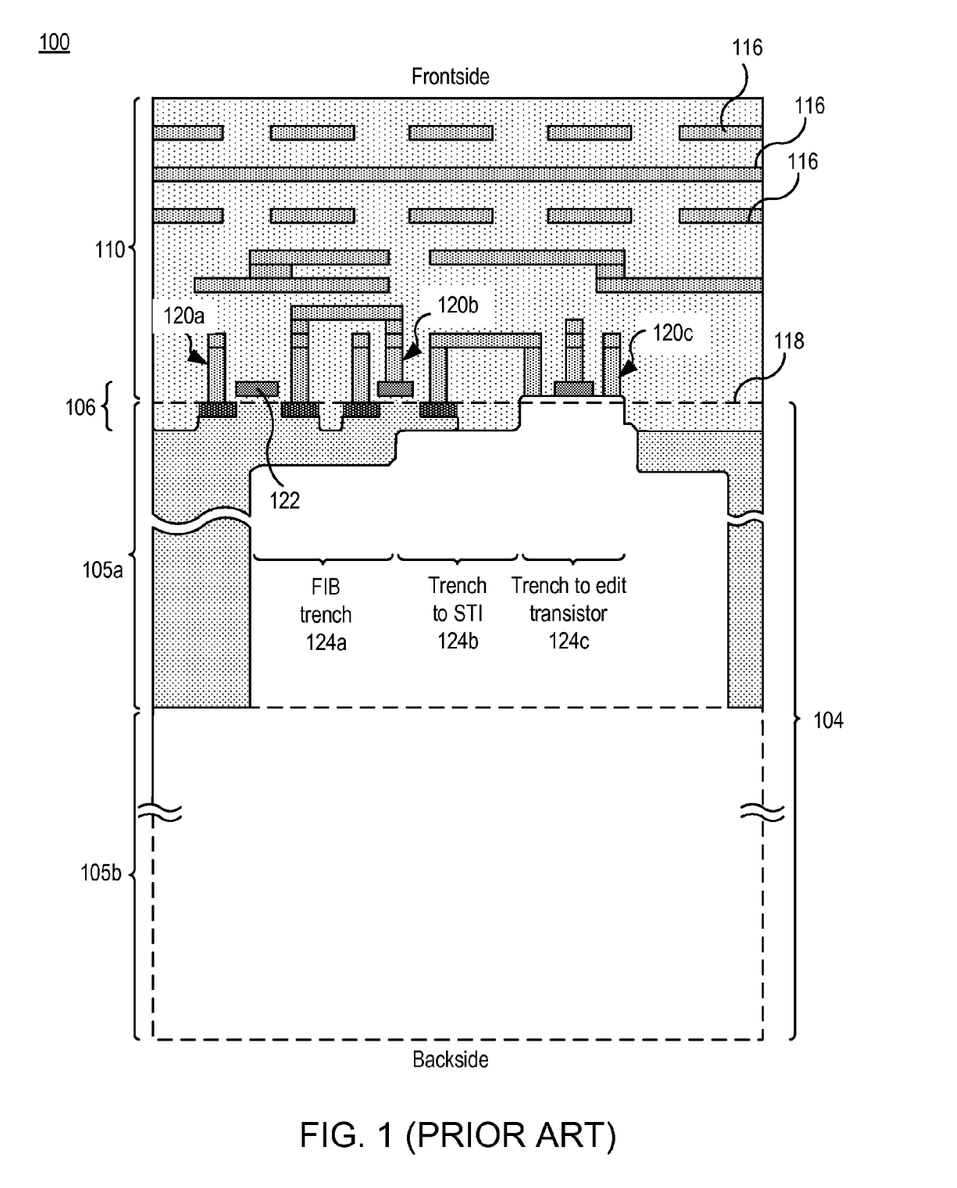
FIG. 1 shows a cross section diagram of a conventional die, where several portions of the substrate are removed to form trenches for backside security attacks.

However, conventional approaches lack sufficient protection against the backside attacks on the IC. FIG. 1 shows a cross section diagram of a conventional die 100, where several portions of the substrate 104 are removed to form trenches for backside security attacks. The die 100 includes the substrate 104 and a layer 110, where the line 118 represents the original top surface of the substrate before the layer 110 is deposited on the substrate. Several components may be deposited in the layer 110. For example, the meshes 116 may be implemented on the frontside of the die 100 to prevent the frontside attack. In another example, a transistor 120a may include a pair of drain and source diffused into the substrate 104 and a gate 122 deposited above the line 116, where these components are disposed in an active device region 106. Individual transistors may be connected to each other by metal interconnects, situated above the transistor level. For the purpose of illustration, only seven metallization layers on top of the gate layer are shown in FIG. 1. The transistors are separated from each other using various isolation techniques, such as Shallow Trench Isolation (STI).

For backside security attacks, the lower portion 105b of the substrate 104 may be milled or polished, where the typical thickness of the lower portion is about 300 μm. Then, depending on the types of attacks, the remaining upper portion 105a of the substrate 104, which has a typical depth of about 15 μm, may be removed at different depths, forming trenches. Smaller area of interest, where there is critical information, is further milled down to a small thickness so that the data flow can be measured by suitable techniques, such as laser scanning or other visual techniques. For instance, the attacker may use Focused Ion Beam (FIB) technique that is an invasive technique for editing circuits. FIB technique is commonly used to permanently modify a portion of the layer 110 and/or selectively remove passivation with a high degree of accuracy. FIB technique can connect nodes in the layer 110 as well as sever the connection between connected nodes, to thereby extract the secured information from the die 100. To apply the FIB technique, the attacker may make a trench 124a on the upper portion 105 of the substrate 104 so that the ion beam illuminated from the backside of the die 100 may reach the components in the layer 110.

Some of the transistors in the die 100 may be separated by the Shallow Trench Isolation (STI) process from each other. In general, during the STI process, N– wells, drains and sources are diffused in the upper portion 105a of the substrate. To get access to the target transistor 120b separated by the STI process, the attackers may remove a portion of the 105a to form a trench 124b below the transistor 120b. Then, the attacker may modify the fuse bit of the transistor 120b so that the copy protection mechanisms of the die 100 can be circumvented to thereby extract the secret information stored in the die.

To edit the circuit in the die 100, the attacker may make a trench 124c up to a target transistor 120c and remove a bottom portion of the target transistor. The attacker may manipulate the transistor 120c to change decisions, to thereby control/access to signals in the die 100 and extract secret information stored in the die.

For the purpose of illustration, only three types of backside security attacks are shown in FIG. 1. However, the attacker may make trenches of different shapes and depths, depending on the types of backside security attacks. Currently, the conventional dies lack a suitable protection mechanism and are vulnerable to the backside security attacks. Therefore, a better solution is needed to provide a mechanism to protect the dies from the backside security attacks.

SUMMARY OF THE DISCLOSURE

In one aspect of the present invention, a device for protecting a substrate from a backside security attack includes: a first electrode formed in the substrate; a second electrode formed in the substrate; and an electrical insulator formed in the substrate and surrounding the first electrode so that the substrate under the electrical insulator forms a portion of an electrical path between the first and second electrodes. The electrical resistance of the electrical path changes when the substrate is modified to thereby detect the backside security attack.

In another aspect of the present invention, a chip package includes a die that has a substrate and a device for protecting the substrate from a security attack. The device includes: a first electrode formed in the substrate; a second electrode formed in the substrate; and an electrical insulator formed in the substrate and surrounding the first electrode. A portion of the substrate under the electrical insulator forms an electrical path between the first and second electrodes. The electrical resistance of the electrical path changes in response to modification of the portion of the substrate to thereby detect a security attack of the substrate.

BRIEF DESCRIPTION OF THE DRAWINGS

References will be made to embodiments of the invention, examples of which may be illustrated in the accompanying figures. These figures are intended to be illustrative, not

DETAILED DESCRIPTION OF THE PREFERRED EMBODIMENTS

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components in the figures are not restricted to connections that are effected directly. Instead, connections illustrated in the figures between components may be modified or otherwise changed through the addition thereto of intermediary components, without departing from the teachings of the present invention.

Figure 2:
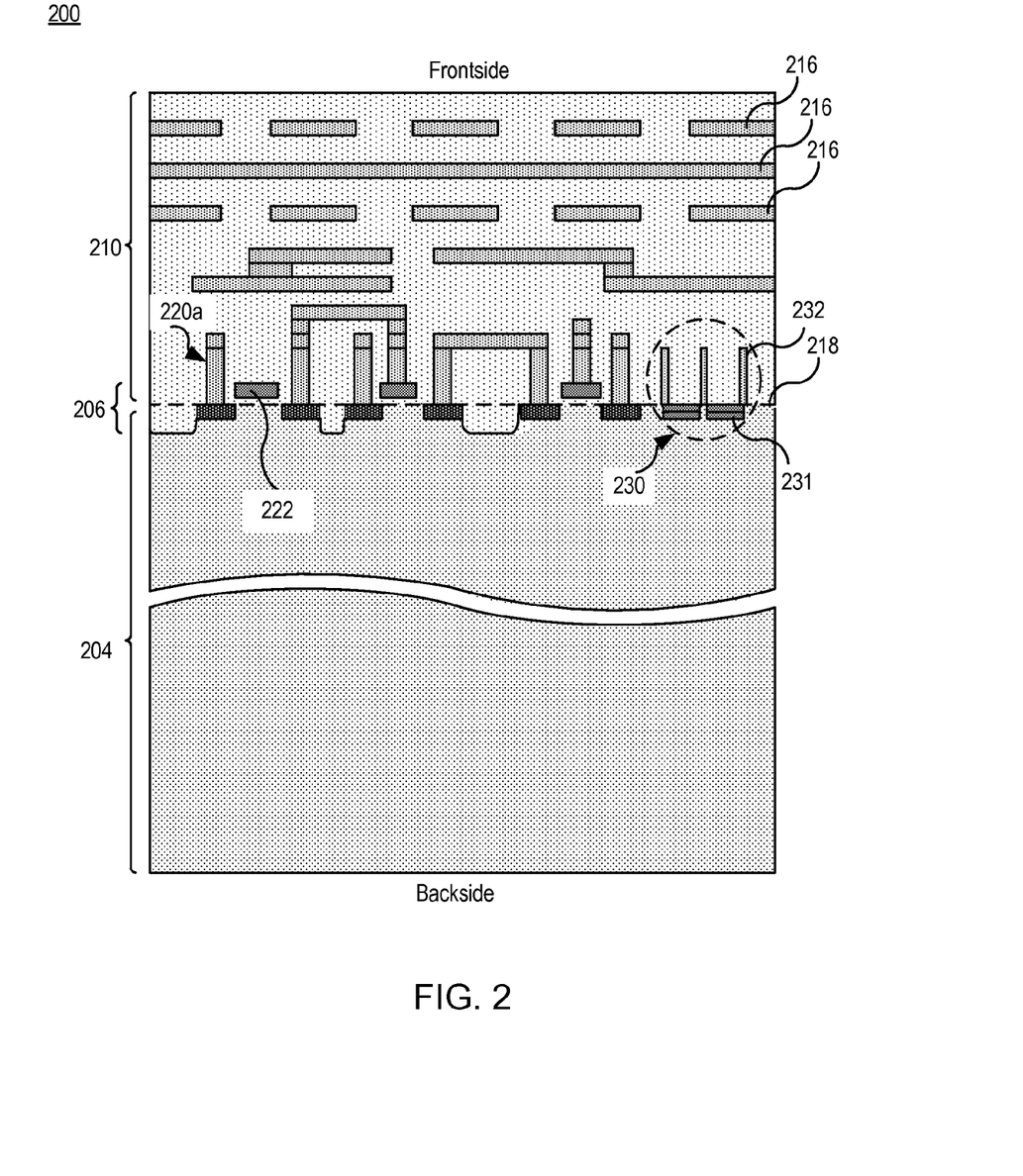
FIG. 2 shows a cross sectional diagram of a die according to one embodiment of the present invention.

FIG. 2 shows a perspective view of a die 200 according to one embodiment of the present invention. The die 200 includes the substrate 204, which is formed of bulk silicon, for instance, and a layer 210, where the line 218 represents the original top surface of the substrate before the layer 210 is deposited on the substrate. The die 200 is similar to the die 100 in FIG. 1, with the differences that a security device 230 for detecting the backside security attack is implemented in the substrate 204. The security device 230 may include a sensor 231 and suitable connection mechanisms 232 for communicating electrical signal with a device external to the security device 230. For brevity, the connection mechanism 232 is shown to have only one metal layer, even though other suitable configurations of connection mechanisms can be implemented in the layer 210. It is noted that the security device 230 may be installed in other suitable devices/systems to detect the similar security attacks.

The components of the device 200 may be similar to their counterparts of the device 100, with the difference that the device 200 includes the security sensor 231. For example, in embodiments, meshes 216 may be implemented on the frontside of the die 200 to prevent the frontside attack. In another example, a transistor 220a may include a pair of drain and source diffused into the substrate 204 and a gate 222 deposited above the line 218, where these components are disposed in an active device region 206.

Figure 3A:
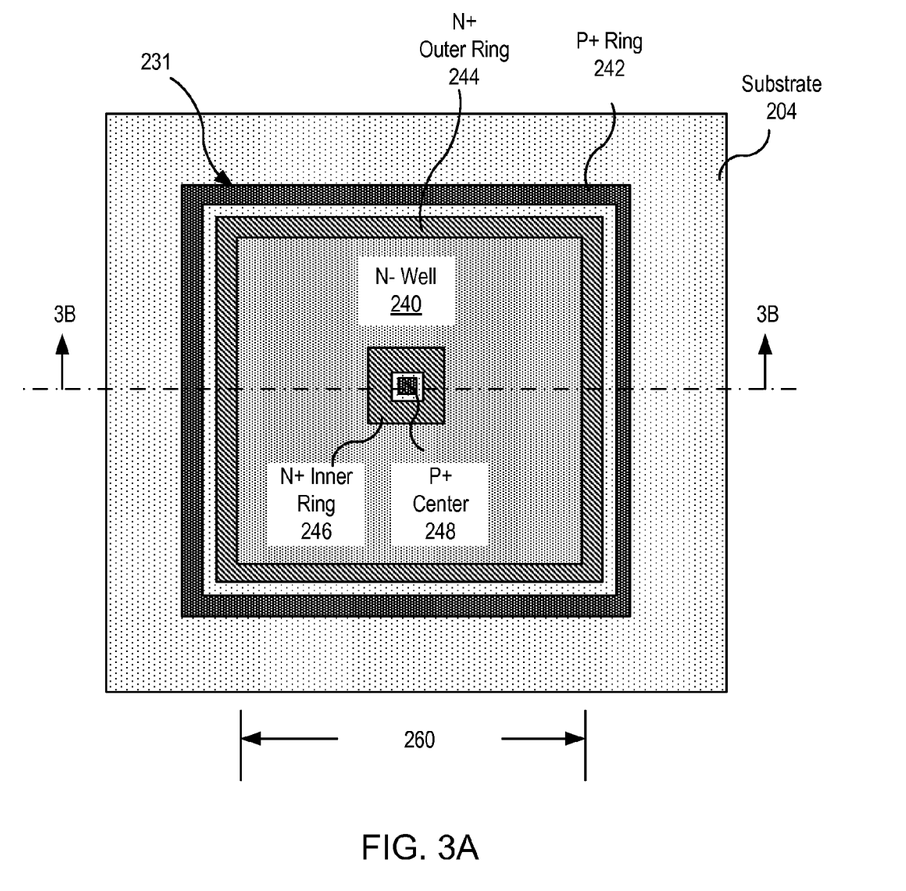
FIGS. 3A and 3B show top and cross sectional views of the security device in FIG. 2.
Figure 3B:
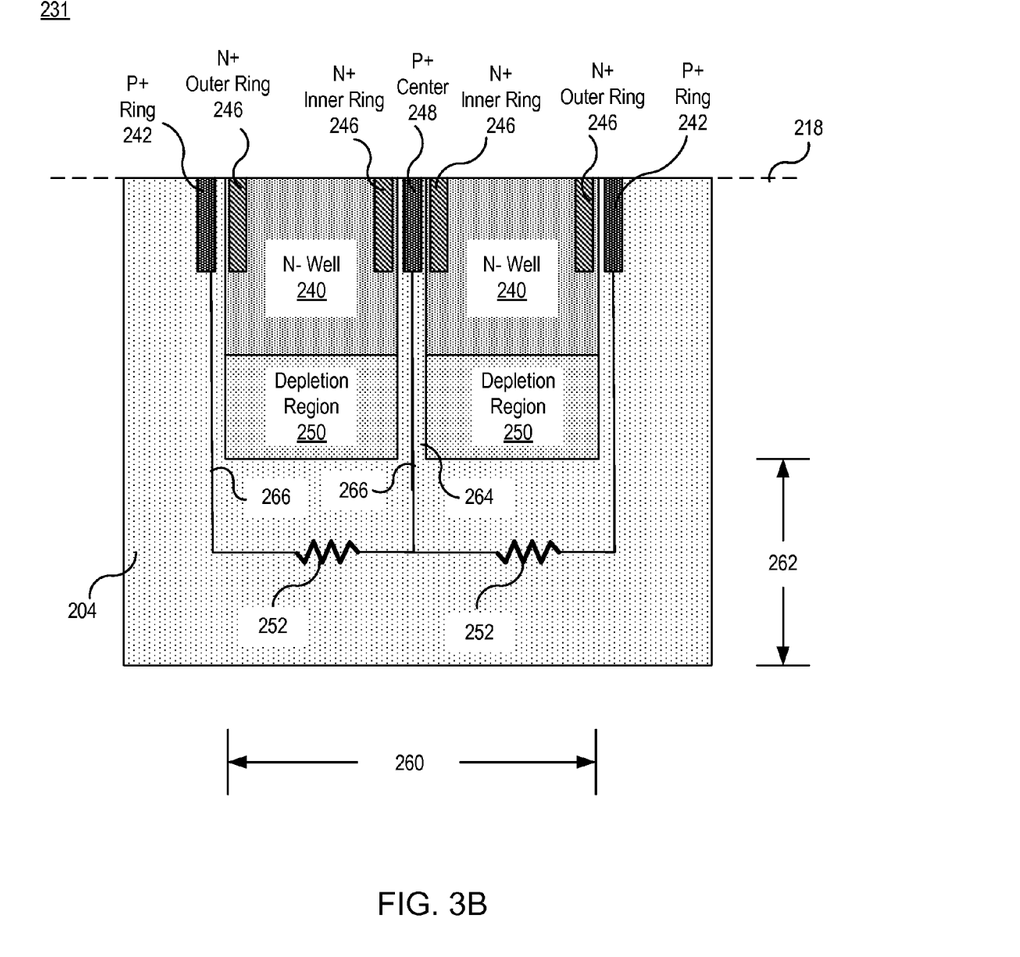

FIG. 3A shows a top view of the sensor 231 in FIG. 2. FIG. 3B shows a cross sectional view of the sensor 231 in FIG. 3A, taken along the line 3B-3B in FIG. 3A. In FIGS. 3A and 3B, only a portion of the substrate 204 near the sensor 231 is shown. As depicted, the sensor 231 includes: a P+ center/island 248; an N+ inner ring 246 surrounding the P+ center/island 248; a N− well 240 having a generally donut shape; a depletion region 250 having a generally donut shape and located beneath the N− well 240; an N+ outer ring 244; and a P+ ring 242. In embodiments, the substrate 240 is formed of a suitable P− material, such as silicon. A portion of the substrate 204 may be doped by diffusion, ion implantation, or any other suitable process, to form the N− well 240 and the depletion region 250. In embodiments, the N− well 240 is doped higher than the substrate 204 so that the depletion region 250 can extend into the substrate as deep as the N− well itself.

The P+ center 248 and P+ ring 242 may be formed by doping P+ material into the substrate 204. The N+ inner ring 246 and N+ outer ring 244 may be formed by doping N+ material into the N− well 240 and prevent inadvertent creation of low-impedance path between P+ center 248 and P+ ring 242, i.e., these rings prevent the latchup so that the substrate 204 becomes an electrical path for current flow between the P+ center 248 and P+ ring 242.

During operation, a current source is connected to the P+ center 248 so that an electrical current is injected into the P+ center 248. In embodiments, the P+ center 248 can be pulled up with a weak switch with a preset current limit. The outer P+ ring 242 is connected to the ground of the system. The N− well 240 may be connected to a power supply having higher voltage than the P+ center 248 so that the current injected into the P+ center 248 does not flow through the N− well 240. The current injected into the P+ center 248 flows through the substrate column/pillar 264 surrounded by the N− well 240 and continues to flow under the depletion region 250 to thereby pass though the substrate 204 and is picked up by the P+ ring 242 that surrounds the N+ outer ring 246. (The lines 266 symbolize the electrical path between the P+ center 248 and P+ ring 242.) The depletion region 250 is devoid of charges. Since the N− well 240 and depletion region 250 do not conduct this electrical current, the electrical current will have to flow under the depletion region 250. The electrical insulator, which collectively refers to the N− well 240 and depletion region 250, causes the electrical current flows through the substrate under the depletion region 250.

A resistance 252 represents the electrical resistance of the substrate 204 that conducts the electrical current from the P+ center 248 to the P+ ring 242. To detect the backside security attacks, the security device 230 monitors the substrate resistance 252. When the die 200 is operating at the normal condition, the substrate resistance 252 has a preset value that is relatively low. However, when the attacker mills down a portion of the substrate 204 and/or form a trench, such as 124 in FIG. 1, the resistance 252 increases since the trench leaves a thin substrate under the depletion region 250. When the substrate 204 is milled down to the depletion region 250, the resistance 252 becomes effectively infinite, i.e., the electrical circuit between the P+ center 248 and the P+ ring 242 becomes almost open. Since the voltage across the P+ center 248 and the P+ ring 242 is substantially proportional to the substrate resistance 252, the backside security attack can be detected by measuring the voltage across the P+ center 248 and the P+ ring 242.

For brevity, only one sensor 231 is shown in FIG. 2. However, it should be apparent to those of ordinary skill in the art that multiple sensors similar to the sensor 231 may be implemented in the die 200. In embodiments, when multiple sensors are implemented, the current may be randomly injected into each of the P+ center 248 of the sensors to thereby increase the level of security.

In embodiments, the width 260 of the sensor 230 may be changed to control the size of the area in the substrate 204 that is monitored by the security device 230. In general, when the width 260 is large, the current is picked up by the P+ ring 242 at a far distance from the injection point, P+ center 248, and the current can go deeper into the substrate 204, i.e., the effective depth 262 of the substrate 204 that conducts the current is large. In embodiments, a sensor 230 with a small width 260 can be placed near a critical block/area so that the backside attack can be detected when the substrate near the critical block is milled to smaller thickness, such as the trench to STI 124b, to access a critical block in the die 200. For a small sensor, the effective depth 262 is shallow, i.e., the current flows through the area just beneath the deletion region 250. Also, as discussed above, when the trench 124b reaches the bottom surface of the depletion region 250, the resistance 252 becomes effectively infinite, i.e., the sensor 230 has an open circuit.

In embodiments, a sensor 230 with a larger width may be placed near another critical block/area so that a trench, such as FIB trench 124a, can be detected. For a larger sensor, the effective depth 262 is relatively large since the current may go deeper but may not go all the way down to the backside of the substrate 204. If the trench 124a gets close to the depletion region 250, the electrical resistance 252 significantly increases.

In embodiments, a sensor 230 with a very large width 260 may be placed in a large digital block. In this case, the current may flow through the entire substrate thickness, i.e., the effective depth 262 becomes almost as large as the substrate thickness. As such, any attempt to mill a small portion of the substrate 204 may be detected by the sensor 230. When a large digital block is used, the digital circuitry formed in the die 200 may inject noise into the substrate 204, affecting the substrate resistivity measurement. In embodiments, to avoid the effect of the noise, the substrate resistance 252 may be measured only at the power up stage or when the digital circuitry is not switching. In embodiments, the N− well 240 may provide some level of isolation from the noise so that the digital circuitry may not inject much noise into the substrate 204, making the effect of noise ignorable.

In embodiments, a sensor 230 may be integrated in a large N− well 240 for a digital block since installing a large N− well just for the sensor may require a large IC area. In such a case, the N− well 240 may house other circuitry so that the area penalty can be reduced.

As discussed above, the width 260 of the N− well 240 can be adjusted to determine the effective depth 262 of the substrate to be monitored for backside security attacks. In embodiments, the width 260 of the N− well 240 can be larger than the substrate thickness, which is typically about 300 μm, so that the current can flow through the entire substrate. For instance, if the center pillar 264, which is a portion of the substrate surrounded by the N− well 240, and P+ ring 242 are 1000 μm apart (not taking sideways fringing), the number of squares is 3.3 (i.e., 1000 μm/300 μm). In general, substrate resistance is proportional to the number of squares. When the substrate 204 is milled down to 30 μm, the number of squares increases to 33 (i.e., 1000 μm/30 μm). This increases the substrate resistance. If the center pillar 264 is too narrow, the resistance of the center pillar can become so high that the change in the number of squares from 3.3 to 33 may not be detected. In such a case, the center pillar 264 can be made wider, to reduce the resistance thereof, making the substrate resistance 252 to be dominant parameter in monitoring the backside security attacks.

Figure 4:
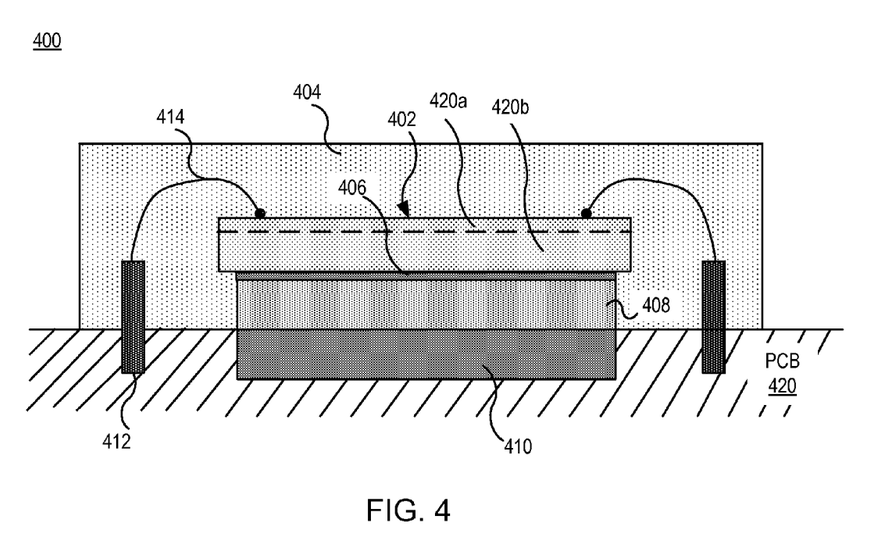
FIG. 4 shows a schematic diagram of a chip package according to another embodiment of the present invention.

FIG. 4 shows a schematic diagram of a chip package 400 according to another embodiment of the present invention. As depicted, the chip package 400 includes: a die 402 having a security device; a protective package layer 404 surrounding the die 402; one or more bond wires 414 for electrically connecting the die 402 to one or more electrical contact 412; a conductive adhesive (such as epoxy) layer 406; an exposed pad 408 secured to the die 402 by the conductive adhesive layer 406; and a printed-circuit-board (PCB) 420 having a ground connection 410 connected to the exposed pad 408. In embodiments, the security device in the die 402 is similar to the security device 230 in the die 200, i.e., the die 402 includes a layer 420a and a substrate 420b that are similar to the layer 210 and a substrate 204, respectively. The exposed pad 408 may be formed of thermally conductive material, such as metal, and dissipate heat energy generated by the die 402 during operation.

The current flow exiting the center pillar (such as 264) of the sensor (such as 231) in the die 402 is collected by the exposed pad 408 since the exposed pad offers the least resistance path. Thus, when the exposed pad 408 remains attached to the die 402, the resistance between the center pillar and the P+ ring will be small. However, when the exposed pad 408 is removed (and/or the backside of the die is milled for a backside security attack), the resistance will increase substantially and thus, the backside security attack can be easily detected. Thus, the security device in the die 402 is able to detect the security attack on the expose pad 408 as well as the substrate of the die 402. It is noted that, even without the exposed pad, the backside security attack can be detected by the security device described in conjunction with FIGS. 2-3B.

Figure 5A:
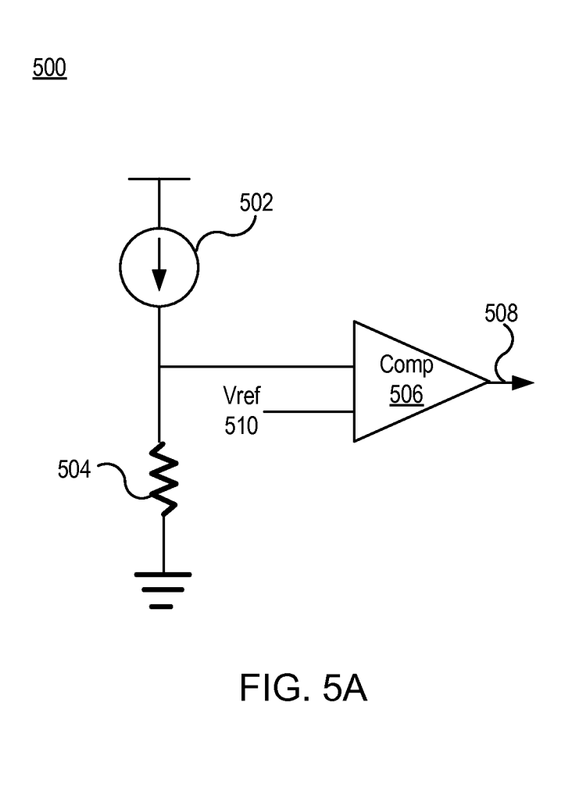
FIGS. 5A and 5B show schematic diagrams of circuit implementation of the security devices in FIGS. 2-4 according to embodiments of the present invention.
Figure 5B:
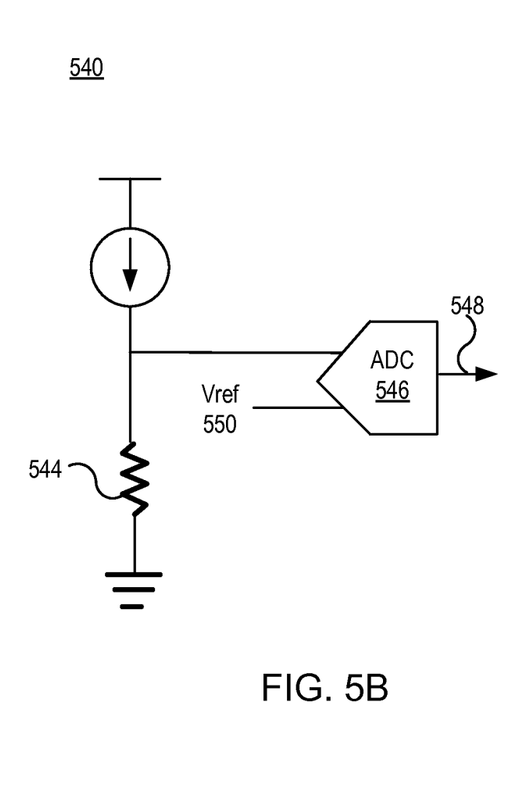

FIGS. 5A and 5B show schematic diagrams of circuit implementation of the security devices in FIGS. 2-4 according to embodiments of the present invention. As depicted in FIG. 5A, the circuit 500 includes a current source 502 and a comparator 506. A reference voltage, Vref, 510 is a preset threshold voltage and input to the comparator 506. The comparator 506 compares the Vref 510 to the voltage drop across the resistance 504, where the resistance 504 corresponds to the resistance of the effective depth 262 of the substrate (or, the resistance of the substrate/exposed pad 408). When the substrate 204 is milled and/or the exposed pad 408 is detached from the die, the resistance 504 changes to increase the voltage drop across the resistance 504. In embodiments, when the voltage drop exceeds the Vref 510, the comparator 506 may send an output signal 508 so that the critical information in the die may be destroyed.

The circuit 540 in FIG. 5B is similar to the circuit 500 in FIG. 5A, with the difference that an analog-to-digital converter (ADC) 546 is used in place of the comparator 506. The ADC 546 receives two input voltages (i.e., the voltage drop across the resistance 544 and a Vref 550), and outputs a signal that includes information of a ratio between the two input voltages. In embodiments, when the ratio reaches a preset value, the ADC 546 sends an output signal so that the critical information in the die may be destroyed. Hereinafter, the term module refers to either the comparator 506 or ADC 546.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A device for protecting a substrate of an integrated circuit (IC) from a security attack, comprising:
    a first electrode formed in a substrate;
    a second electrode formed in the substrate, the substrate defining a substrate resistance between the first electrode and the second electrode; and
    an electrical insulator formed in the substrate and surrounding the first electrode, the electrical insulator comprises a depletion region that forces current to flow outside of the depletion region, wherein a modification to the substrate causes a change in the substrate resistance between the first electrode and the second electrode, the change being detectable as a security attack on the device.

2. A device as recited in claim 1, wherein the substrate is formed of P− type material, the first and second electrodes are formed of P+ type material, and the electrical insulator comprises an N− well that surrounds the first electrode.

3. A device as recited in claim 2, wherein the depletion layer is formed under the N− well in the substrate.

4. A device as recited in claim 2, further comprising:
    a first N+ ring diffused between the first electrode and the N− well and surrounding the first electrode and adapted to prevent a latchup between the first and second electrodes during operation.

5. A device as recited in claim 2, wherein the second electrode has a ring shape, further comprising:
    a second N+ ring diffused between the second electrode and the N− well and adapted to prevent a latchup between the first and second electrodes during operation.

6. A device as recited in claim 2, wherein the second electrode is coupled to a ground and the N− well is subject to a voltage higher than a voltage applied to the first electrode during operation to thereby electrically insulate the first electrode.

7. A device as recited in claim 1, further comprising:
    a current source for providing a current flow through the substrate resistance; and
    a circuit for comparing a voltage drop across the substrate resistance to a reference voltage and generating a signal when the voltage drop exceeds the reference voltage to thereby detect the security attack.

8. A device as recited in claim 7, wherein the circuit is a comparator or an analog-to-digital converter.

9. A chip package, comprising:
    a die comprising:
    a substrate; and
    a device for protecting the substrate from a security attack, the device comprising:
    a first electrode formed in the substrate;
    a second electrode formed in the substrate, the substrate defining a substrate resistance between the first electrode and the second electrode;
    an electrical insulator formed in the substrate and surrounding the first electrode, the electrical insulator comprises a depletion region that forces current to flow outside of the depletion region, wherein a modification to the substrate causes a change in the substrate resistance between the first electrode and the second electrode, the change being detectable as a security attack on the chip package; and
    circuitry to monitor the modification.

10. A chip package as recited in claim 9, wherein the substrate is formed of P− type material, the first and second electrodes are formed of P+ type material, and the electrical insulator comprises an N− well that surrounds the first electrode.

11. A chip package as recited in claim 10, further comprising:
    a first N+ ring diffused between the first electrode and the N− well and surrounding the first electrode and adapted to prevent a latchup between the first and second electrodes during operation.

12. A chip package as recited in claim 10, wherein the second electrode has a ring shape, further comprising:
    a second N+ ring diffused between the second electrode and the N− well and adapted to prevent a latchup between the first and second electrodes during operation.

13. A chip package as recited in claim 10, wherein the second electrode is coupled to a ground and the N− well is subject to a voltage higher than a voltage applied to the first electrode during operation to thereby electrically insulate the first electrode.

14. A chip package as recited in claim 9, wherein the circuitry monitors a voltage difference between the first and second electrodes.

15. A chip package as recited in claim 9, further comprising:
    a current source for providing a current flow through the substrate resistance; and
    a circuit for comparing a voltage drop across the substrate resistance to a reference voltage and generating a signal when the voltage drop exceeds the reference voltage to thereby detect the security attack.

16. A chip package as recited in claim 15, wherein the is a comparator or an analog-to-digital converter.

17. A chip package as recited in claim 9, further comprising:
    a pad attached to the die by a conductive adhesive and forming a portion of an electrical path between the first and second electrodes.

18. A chip package, comprising:
    a die comprising:
    a substrate; and
    a device comprising:
    a first electrode formed in the substrate;
    a second electrode formed in the substrate that has a substrate resistance between the first electrode and the second electrode; and
    an electrical insulator formed in the substrate and surrounding the first electrode;
    a pad attached to the substrate and forming a portion of an electrical path between the first and second electrodes, the electrical insulator forces current to flow through the substrate resistance, such that a modification related to the substrate resistance is detectable as a security attack on the on the chip package.

19. A chip package as recited in claim 18, further comprising a device to monitor the security attack, the device monitors a voltage difference between the first electrode and the second electrode.

20. A chip package as recited in claim 19, wherein the depletion layer is formed under the N– well in the substrate.

* * * * *